United States Patent [19]

Bienvenu

[11] 3,994,737
[45] Nov. 30, 1976

[54] POLYVALENT METAL SALTS OF OXIDIZED WAXES
[75] Inventor: Joseph O. Bienvenu, Longview, Tex.
[73] Assignee: Petrolite Corporation, St. Louis, Mo.
[22] Filed: Dec. 20, 1974
[21] Appl. No.: 534,678

[52] U.S. Cl. .................................. 106/31; 106/270; 106/272
[51] Int. Cl.² .......................................... C09D 11/12
[58] Field of Search ...................... 106/31, 271, 270

[56] References Cited
UNITED STATES PATENTS
2,890,125  6/1959  Mange .................................. 106/23

FOREIGN PATENTS OR APPLICATIONS
1,224,440  3/1971  United Kingdom
786,654  11/1957  United Kingdom Primary Examiner—Theodore Morris
Attorney, Agent, or Firm—Sidney B. Ring; Hyman F. Glass

[57] ABSTRACT

This invention relates to polyvalent metal salts of oxidized non-benzenoid hydrocarbon waxes, and to uses thereof, particularly in carbon paper inks.

14 Claims, No Drawings

POLYVALENT METAL SALTS OF OXIDIZED WAXES

In a carbon paper ink formulation, the hard wax is an important component because essential characteristics of the ink are imparted by the wax. A carbon ink wax should exhibit good dye solubility, pigment dispersing ability, and contribute to the hardness and oil/dye retention of the finished ink. Also, the wax should produce a low viscosity ink (Newtonian, no thixotropy) at the temperature of application. A wax must be able to produce the desired ink properties when used in a relatively small concentration. This is especially true in the production of a one-time carbon paper ink, since the concentration of the high melting wax in the formulation is usually from 8 to 12 percent.

Waxes which are currently used in carbon ink production are: (1) natural waxes, such as carnauba, ouricury and Montan wax, (2) modified microcystalline and synthetic waxes, such as those described in U.S. Pat. No. 2,890,124, dated Oct. 1, 1956, U.S. Pat. No. 2,890,125, dated Oct. 1, 1956, and U.S. Pat. No. 3,163,548, dated May 22, 1961. These waxes are relatively expensive, consequently there is a need for a more economical wax suitable for use in carbon ink production.

I have now discovered that polyvalent metal salts of oxidized non-benzenoid hydrocarbon waxes are useful in carbon paper inks. In accordance with this invention, an oxidized hydrocarbon wax is reacted with a polyvalent metal such as those of Periodic Table Groups II, IIA, IIIA and IV. Preferably the polyvalent metal is an oxide or hydroxide of a divalent metal of Group IIA of the Periodic Table, or with an oxide or hydroxide of a monovalent metal from Group IA followed by a base exchange with a di or multivalent metal such as those of Groups II, IIIA, and IV of the Periodic Table.

Oxidized hydrocarbons suitable for the purpose of this invention are petroleum waxes (microcrystalline and paraffin), synthetic waxes such as Polywax-650, Fischer-Tropsch wax, alpha-olefins, and certain polyethylene and polypropylenes. Suitable waxes have melting points of 120° F to 230° F prior to oxidation.

The preferred types of oxidized hydrocarbons are the hard waxes such as microcrystalline wax, C30+ alpha-olefin fraction, Polywax-650, and Fischer-Tropsch wax with melting points within the range of 160° F to 220° F prior to oxidation.

Petroleum waxes which are suitable for the purpose of this invention are tank bottom derived microcrystalline wax, plastic microcrystalline wax, and paraffin wax. The preferred types are the tank bottom derived microcrystalline wax with a melting point within the range of 175° F to 200° F, and the plastic microcrystalline wax with a melting point between 165° and 175° F. Paraffin wax may be used, but more favorable results are obtained if the wax is blended with higher molecular weight material.

The alpha-olefins referred to in this invention are preferably the straight chain olefins produced by the polymerization of ethylene as described in "Polymerization and Polycondensate Processes," Advances in Chemistry, Series No. 34 (American Chemical Society, 1962), and by Zeiss, Organo-Metallic Chemistry (Reinhold, 1960). The preferred fraction is the C30+ alpha-olefin fraction. Lower molecular weight fractions can be used, however, it is advantageous to blend these with higher molecular weight wax and/or polyethylene.

Synthetic hydrocarbon waxes which are applicable in this invention are the intermediate molecular weight polymers, derived from the polymerization, copolymerization, and telomerization of ethylene, or from the Fischer-Tropsch synthesis of hydrocarbons from carbon monoxide and hydrogen mixtures. The higher molecular weight polywaxes can be blended with lower molecular weight waxes and other hydrocarbons, such as wax oils, for use in this invention. Two commercially availabe products typifying the above groups are Polywax-650 and Paraflint wax. Polywax-650 with a melting point of approximately 210° F and Paraflint wax, a Fischer-Tropsch wax with 220° F melting point, are desirable products for this invention.

Polyethylenes of this invention are the various polymers derived from the polymerization of ethylene such as described in U.S. Pat. No. 2,504,400, dated Apr. 18, 1950, U.S. Pat. No. 2,699,457, dated Jan. 11, 1955, Phillips Petroleum Company's Belgian Pat. No. 530,617, dated July 22, 1954, and Kirk-Othmer, Encyclopedia of Chemical Technology, Volume 10, pp 938–957. Lower molecular weight polyethylenes may be used, but the higher molecular weight polymers, because of their higher viscosity, are best blended with other waxes. Polypropylenes, polybutylenes, and other olefin polymers and copolymers may also be used in wax blends for the purpose of this invention.

The art of oxidizing inert hydrocarbon waxes such as those described above is well known and has been extensively described in the literature. The preferred type of oxidation for the purpose of this invention is air oxidation with or without oxidation catalyst at temperatures ranging from 240° to +320° F. A wax or blend may be modified prior to or after the oxidation by processes, such as solvent extraction, hydrogenation, polymerization, and cracking. Depending on the susceptibility of the precursor to air oxidation, catalysts, such as soluble or insoluble organic salts, may be used in concentrations of 0.2 percent to approximately 2 percent. The preferred oxidation catalysts are cobalt, manganese, and zinc soaps, such as the naphthenates, octoates, oleates, and stearates. Oxidation time or degree of oxidation is dependent on the type of product desired.

An oxidized hydrocarbon wax is reacted with a polyvalent metal such as those of Periodic Table Groups II, IIA, IIIA and IV. Preferably the polyvalent metal is the oxide or hydroxide of a divalent metal of Group IIA of the Periodic Table, or with a base of a monovalent metal from Group IA followed by a double decomposition reaction with a salt of a di or multivalent metal, such as those of Groups II, IIIA, and IV of the Periodic Table.

The degree of oxidation of the hydrocarbon wax may vary from about 10 to 60 acid number and a saponification number of about 20 to 150, but preferably from about 10 acid number (20–30 saponification number) to 40 acid number (80–90 saponification number). Products with greater acid numbers may be used but for reasons of economy the lower acid number products are preferred. Concentration of the base or metal salt may vary from approximately the acid number equivalent to approximately the saponification number equivalent of the oxidized wax.

Following are examples which describe the process more specifically and illustrate various applications of the process.

EXAMPLE 1

A blend consisting of 50% C-700 wax (a tank bottom derived microcrystalline wax with a melting point of 196° F) and 50% Polywax-650 (a synthetic wax, 210° F melting point) is charged to an oxidizer, and 0.2% of cobalt naphthenate is added. Air is admitted through a sparger at a rate of 4 cc/minute/g wax. Temperature is adjusted to 290°–300° F, and the wax is oxidized to 16.1 acid number (42.8 saponification number). The oxidized wax is transferred to a reactor and the temperature adjusted to 205°–210° F. Water (0.25%, wt. basis) is added, then 1.8 wt. percent of calcium hydroxide (corresponding to about .97% calcium) is added and reacted for 30 minutes with agitation at 205°–210° F. Water is removed by distilling under vacuum at 240° F.

The nature of the product is dependent on the degree of oxidation and the concentration of the base. Depending on the type of product desired, the degree of oxidation and the concentration of the base may be varied. Following are examples (1A-3) which illustrate to a certain extent how the above procedure may be modified.

EXAMPLE 1A

Following the oxidation procedure of Example 1, a wax blend is oxidized to 19.8 acid number (52.8 saponification number), then reacted with 0.5% of water and 2.4% of calcium hydroxide (corresponding to about 1.3% calcium) according to the reaction procedure described in Example 1.

EXAMPLE 1B

A wax blend as described in Example 1 is oxidized to 23.7 acid number (66.3 saponification number) and reacted with 0.5% water and 2.7% calcium hydroxide (corresponding to about 1.5% calcium) according to the procedures described in Example 1.

EXAMPLE 1C

The wax blend as described in Example 1 is oxidized to 34.6 acid number (78.5 saponification number) at 250° F, then reacted with 0.25% of water and 4.0% of calcium hydroxide (corresponding to about 2.2% calcium) in accordance with the procedures presented in Example 1.

EXAMPLE 2

A C30+ alpha-olefin fraction with a melting point of 178° F is charged to an oxidizer and heated to 265° F. Air is admitted through a sparger at a rate of 4 cc/min/g wax, and the material is oxidized without catalyst at 265° F to yield an oxidized product having an acid number of 19.6 and a saponification number of 59.5. The oxidized product is transferred to a reactor equipped with an agitator and the temperature is adjusted to 205°–210° F. Water (0.5 wt. percent) and calcium hydroxide (3.5 wt. percent, corresponding to about 1.9% calcium) are added and reacted at 205°–210° F for 30 minutes. Water is removed by distilling at 250° F with vacuum for 30 minutes.

EXAMPLE 3

The oxidized C30+ alpha-olefin fraction of Example 2 is reacted with 0.5% of water and 4.5% of calcium hydroxide (corresponding to about 2.4% calcium) according to the procedure described in the above example.

EXAMPLE 4

A blend consisting of 50% microcrystalline wax (196° F melting point) and 50% Polywax-650 (210° F melting point) is oxidized to 25.4 acid number and 75.2 saponification number according to the oxidation procedure of Example 1. The oxidized wax is transferred to a reaction vessel equipped with a stirrer, then reacted with 3.0% of sodium hydroxide (60% solution) for 1 hour at 205°–210° F and 30 minutes at 230°–235° F. 4.1% of calcium chloride (40% solution), corresponding to about 1.5% calcium, is added and reacted at 230°–235° F for 30 minutes. The wax is washed two times with water, then dried by either distilling under vacuum at 240° F or stripping with nitrogen at 250° F.

EXAMPLE 5

The oxidized wax of Example 4 is reacted with 3.5% of sodium hydroxide and 4.8% of calcium chloride (corresponding to about 1.7% calcium) according to the procedure presented in Example 4.

It will be seen that the percentage of calcium present in the compositions of the foregoing examples ranges from about 0.97% to about 2.4%.

As indicated by the data in Table I, products prepared from partially oxidized petroleum or synthetic waxes by the procedure of this invention are suitable for use in carbon paper ink production. The better products yield low viscosity (little thixothropy) carbon inks with good pigment dispersion. Inks prepared with these products also display good flow and oil retention properties.

Carbon ink properties of a wax are determined by testing the wax in a medium intensity black ink as described in the following Procedure I.

Carbon Ink Formula

| Materials: | Parts by Weight |
|---|---|
| Wax of this invention | 12.0 |
| Paraffin, 142° F M.P. | 30.0 |
| Methyl Violet Base | 0.1 |
| Furnace Black | 22.0 |
| Toning Iron Blue | 3.0 |
| Mineral Oil, 100 SUS | 32.9 |

A mixture consisting of the wax, paraffin, and methyl violet is heated in an oven at 220°–230° F for 2 hours, then charged to a steel ballmill and milled at 220°–230° F for 5 minutes. A mixture comprising the carbon black, iron blue, and mineral oil which was previously heated to 220°–230° F is added and milled at 220°–230° F for 30 minutes. The ink is sampled in a glass jar (13.5 cm × 5.5 cm Diameter) for viscosity determinations, and another sample is obtained in an aluminum weighing dish (2 cm × 6 cm Diameter) for an oil-retention penetration.

Viscosity values for the ink are determined at 6, 12, 30, and 60 RPM at 215° F with a Brookfield viscometer using a No. 1 spindle. The ink sample is aged in an oven at 220° F for 17 hours, then viscosity measurements are again determined at 6, 12, 30, and 60 RPM at 215° F.

The sample of ink in the aluminum weighing dish is aged at 77° F for 17 hours, and the hardness of the ink is determined according to ASTM method D-1321.

TABLE I

| Product | Performance of Wax in Procedure 1 | | | | Oil Retention Penetration |
|---|---|---|---|---|---|
| | Ink Viscosity (Initial/aged)1 | | | | |
| | 6RPM | 12RPM | 30RPM | 60RPM | |
| Example 1 | 17/390 | 18/256 | 20/149 | 19/100 | 22 |
| Example 1A | 15/20 | 15/20 | 15/20 | 15/19 | 28 |
| Example 1B | 14/26 | 13/26 | 15/25 | 15/24 | 29 |
| Example 1C | 17/30 | 17/29 | 18/30 | 18/29 | 31 |
| Example 2 | 27/65 | 27/56 | 25/42 | 22/36 | 27 |
| Example 3 | 23/37 | 23/35 | 22/30 | 20/27 | 28 |
| Example 4 | 15/70 | 14/60 | 15/49 | 15/42 | 33 |
| Example 5 | 15/45 | 13/42 | 15/36 | 15/33 | 33 |

1. Brookfield, cps at 210–215° F.

TABLE II

| Product | Properties of Isocyanated Reaction Products | | |
|---|---|---|---|
| | Melting Point, ° F. | Acid Number | Saponification Number |
| Example 1 | 197 | 2.4 | 29.5 |
| Example 1A | 200 | 2.7 | 32.1 |
| Example 1B | 194 | 2.8 | 43.3 |
| Example 1C | 205 | 4.8 | 27.5 |
| Example 2 | 182 | 3.9 | 37.3 |
| Example 3 | 185 | 1.7 | 28.8 |
| Example 4 | 194 | 4.7 | 35.3 |
| Example 5 | 202 | 4.2 | 28.7 |

Although the products of this invention have been characterized as carbon ink waxes, and more specifically as carbon paper ink waxes, these products are suitable for use in other inks such as news ink, flexographic ink, rotogravure ink, and screen ink. Also, the products may be used in solvent inks, protective coatings, mold release compounds, and various types of polishes such as floor polish, shoe polish, furniture polish, and car polish.

Products of the invention may be further modified by incorporating a monovalent metal, preferably potassium or lithium, for use in various polish formulations. Also, other bases and metal salts, as indicated in the process, may be used in the procedure. For example, a zinc or aluminum salt when substituted for the calcium salt in Examples 4 or 5 produces a good carbon ink wax which may be more desirable than the product derived with the calcium salt in certain applications.

I claim:

1. A composition comprising
   a. an oxidized non-benzenoid hydrocarbon wax characterized as follows:
      1. Said wax having a melting point of 120°–230° F prior to oxidation;
      2. Said wax having an acid number of from about 10 to 60 and/or a saponification number of about 20–150 after oxidation; and
   b. a polyvalent metal salt of said oxidized wax, the percentage of said metal in said composition being at least about 0.97%.

2. The composition of claim 1 where the percentage of polyvalent metal in the composition is from about 0.97% to about 2.4%.

3. The composition of claim 2 where
   1. Said wax prior to oxidation has a melting point of about 160°–220° F;
   2. Said oxidized wax has an acid number of about 10–40 and/or a saponification number of 20–90.

4. The composition of claim 3 where the polyvalent metal is a member of the following groups of the Periodic Table: II, IIA, IIIA and IV.

5. The composition of claim 4 where the polyvalent metal is calcium, zinc or aluminum.

6. The composition of claim 5 where the wax is a microcrystalline wax, an alpha-olefin wax, a Fischer-Tropsch wax, a polyethylene type wax or mixtures thereof.

7. A carbon paper ink containing the composition of claim 1.

8. A carbon paper ink containing the composition of claim 3.

9. A carbon paper ink containing the composition of claim 4.

10. A carbon paper ink containing the composition of claim 5.

11. A carbon paper ink containing the composition of claim 6.

12. The composition of claim 5 where the polyvalent metal is calcium.

13. A carbon paper ink containing the composition of claim 2.

14. A carbon paper ink containing the composition of claim 12.

* * * * *

UNITED STATES PATENT AND TRADEMARK OFFICE
CERTIFICATE OF CORRECTION

PATENT NO. : 3,994,737
DATED : November 30, 1976
INVENTOR(S) : Joseph O. Bienvenu It is certified that error appears in the above—identified patent and that said Letters Patent are hereby corrected as shown below:

Column 5, line 16 (In TABLE II), delete

--- Isocyanated ---

Signed and Sealed this

Twenty-sixth Day of April 1977

[SEAL]

Attest:

RUTH C. MASON
Attesting Officer

C. MARSHALL DANN
Commissioner of Patents and Trademarks